Patented May 23, 1950

2,508,378

UNITED STATES PATENT OFFICE 2,508,378

METHOD OF PREPARING SUBTILIN

Robert E. Feeney, El Cerrito, and John A. Garibaldi, San Francisco, Calif., assignors to the United States of America as represented by the Secretary of Agriculture No Drawing. Application February 12, 1948, Serial No. 8,017

6 Claims. (Cl. 195—96)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to the production of the antibiotic subtilin by culturing a particular strain of Bacillus subtilis on suitable media. The invention particularly concerns the composition of the media used and specifically the mineral nutrients therein.

An object of this invention is to provide processes for obtaining increased yields of subtilin.

Another object of this invention is to provide processes for obtaining increased yields of subtilin by control of the composition of the culture in which the subtilin is produced.

Further objects and advantages of this invention will be obvious from the description of the invention.

Subtilin is an antibiotic produced by a particular strain of Bacillus subtilis and has antibiotic activity against a number of pathogenic organisms including Bacillus anthracis, Diplococcus pneumoniae, Neisseria gonorrheae, Mycobacterium tuberculosis, and Endamoeba histolytica.

Known methods of producing subtilin have not given uniform yields of the antibiotic because it was not realized heretofore that certain mineral elements play such an important part in the biosynthesis. It has been found that small amounts of these elements cause drastic differences in the yield of subtilin. Thus the inventors have found that the following elements are vital to the production of subtilin, i. e., potassium, magnesium, manganese, iron, zinc, sulphur, and phosphorus. Further, by control of the amounts of these elements, maximum yields of the antibiotic may be obtained.

It is to be emphasized that control of these elements is not merely a matter of causing maximum cell growth. In many instances it is possible to obtain good cell growth without obtaining a good yield of subtilin. For instance, rubidium may be substituted in the medium for potassium. In such case the cell growth is comparable to that with potassium but the formation of subtilin is practically negligible. In the case of magnesium, an increase of from 2 P. P. M. of magnesium to 7 P. P. M. of magnesium will cause no significant change in the amount of cells produced yet the amount of subtilin will be increased more than eight-fold by the same increase in magnesium concentration. In the case of zinc, an increase in the concentration of this element from 0.1 P. P. M. to 0.25 P. P. M. caused no significant change in the amount of cell growth yet the yield of subtilin was more than doubled by the increase in zinc concentration.

The amounts of the elements necessary to obtain good yields of subtilin are as follows:

Potassium—at least 60 P. P. M., preferably at least 100 P. P. M. These figures represent only the lower limits of concentration. This element does not exhibit a toxic effect at higher concentrations. Generally, a concentration of about 400 to 1000 P. P. M. is used to insure presence of sufficient potassium.

Magnesium—about 4 P. P. M. to about 300 P. P. M., preferably 7 to 50 P. P. M. If the medium does not contain citric acid or other organic hydroxy-acid (or salt thereof), magnesium has a deleterious effect on the yield of subtilin if present in a concentration higher than about 50 P. P. M.

Where the medium contains citric acid or other organic acids (or salt thereof) this deleterious effect is counteracted and the concentration of magnesium may be as high as about 300 P. P. M.

Manganese—0.4 P. P. M. to 100 P. P. M., preferably 1 P. P. M. to 100 P. P. M.

Iron—0.6 to about 100 P. P. M., preferably about 1.5 to 10 P. P. M. If the medium does not contain citric acid or other organic hydroxy-acid (or salt thereof), iron has a deleterious effect on the yield of subtilin if present in a concentration higher than about 8 P. P. M. Where the medium contains citric acid or other organic oxy acid (or salt thereof) this effect is counteracted and the concentration of iron may be as high as about 100 P. P. M.

Sulphur—at least 20 P. P. M., preferably at least 70 P. P. M. The amount of sulphur may be increased to any desired degree above these lower limits without decreasing the yield of subtilin. Generally about 800–1,000 P. P. M. are used to insure sufficient sulphur in the medium.

Phosphorus—at least 50 P. P. M., preferably at least 100 P. P. M. Where the amount of phosphorus is greater than about 200 P. P. M., citric acid (or a salt thereof) may be added to the medium. Where such precaution is taken, the amount of phosphorus may be increased to any desired level without deleterious effect. In general, a concentration of about 1000 P. P. M. is used to insure sufficient phosphorus in the medium.

The following examples illustrate particular conditions, steps and materials within the scope of this invention. These examples are given only by way of illustration and not limitation.

In Examples I to IV, the medium used contained the following ingredients:

| | |
|---|---|
| Sucrose | 100 g. |
| $Na_2SO_4$ | 4 g. |
| NaCl | 0.3 g. |
| Salt mixture | 100 ml. |
| $(NH_4)_2HPO_4$ | 8 g. |
| l-Asparagin | 2 g. |
| Glutamic acid | 2 g. |
| Redistilled water | Sufficient to give 1 liter of medium |

The salt mixture contained the following salts per liter: KCl, 3.81 g.; $MgCl_2 \cdot 6H_2O$, 4.18 g.; $ZnCl_2$, 0.104 g.; $FeCl_3 \cdot 6H_2O$, 0.245 g.; $MnCl_2 \cdot 4H_2O$, 0.181 g. When added to the medium in the amount indicated, it gave (in P. P. M.) K, 200; Mg, 50; Zn, 5.0; Fe, 5.0; and Mn, 5.0.

The medium was adjusted to pH of 6.8–6.9 with dilute sodium hydroxide and sterilized before use.

The culture employed in the experiments described in the examples was a strain of *B. subtilis* designated in the stock culture collection of the U. S. Department of Agriculture, Northern Regional Research Laboratory, as B-543.

Subtilin was assayed by a short incubation period turbidimetric bacteriostatic method similar to that described by McMahan [Jour. Biol. Chem., vol. 153, p. 249 (1944)] for penicillin. In this assay, the samples of culture were assayed against a standard sample of isolated subtilin using *Micrococcus conglomeratus* as the test organism. Subtilin yields are expressed in milligrams per liter of culture medium as determined against this standard. The standard used in these experiments was the same as that employed in the applications of Stubbs et al., Ser. No. 776,397, filed Sept. 26, 1947; Dimick et al., Ser. No. 777,843, filed Oct. 3, 1947, now Patent No. 2,476,085, and Dimick et al., 776,396, filed Sept. 26, 1947, now Patent No. 2,459,139.

EXAMPLE I.—EFFECT OF POTASSIUM

In this example, the medium used was that described above with potassium omitted from the salt mixture. Varying amounts of potassium were added, as KCl, to indicate the effect of this element. In each case a 50 ml. sample of the medium was inoculated with *B. sultilis* and the culturing carried out by a surface technique at a temperature of 35° C. After incubation for 72 hours the culture was assayed for subtilin activity and the dry weight of the pellicle determined as a measurement of the degree of cell growth. The following results were obtained:

Table 1

| Expt. | Potassium added to medium, P. P. M. | Dry weight of pellicle, mg. | Subtilin produced, mg./l. |
|---|---|---|---|
| 1 | 0 | 25 | 0 |
| 2 | 20 | 125 | 30 |
| 3 | 40 | 200 | 120 |
| 4 | 60 | 260 | 280 |
| 5 | 80 | 320 | 490 |
| 6 | 100 | 340 | 590 |
| 7 | 200 | 320 | 750 |
| 8 | 1,000 | 400 | 750 |

None of the three elements closest related chemically to potassium are capable of replacing this element. Thus neither sodium nor caesium supports growth in the absence of potassium. Rubidium can quantitatively replace potassium mole per mole as far as growth is concerned but can not replace potassium for the production of subtilin. Thus when an equivalent amount of rubidium was substituted for potassium in experiment No. 3, the yield of pellicle was 210 mg. but the subtilin yield was less than 20 mg./l. When experiment No. 7 was repeated using an equivalent amount of rubidium, the yield of pellicle was 420 mg. and the yield of subtilin 72 mg./l.

EXAMPLE II.—EFFECT OF MAGNESIUM

In this example, the medium used was that described above with magnesium omitted from the salt mixture. Varying amounts of magnesium were added, as $MgCl_2 \cdot 6H_2O$, to indicate the effect of this element. In each case a 50 ml. sample of the medium was inoculated with *B. subtilis* and the culturing carried out by a surface technique at a temperature of 35° C. for 72 hours. The following results were obtained:

Table 2

| Magnesium added to medium, P. P. M. | Dry weight of pellicle, mg. | Subtilin produced, mg./liter |
|---|---|---|
| 0 | 20 | 0 |
| 2 | 450 | 130 |
| 3 | 475 | 290 |
| 4 | 480 | 500 |
| 5 | 480 | 680 |
| 7 | 480 | 900 |
| 100 | 480 | 350 |

It was found by experimentation that calcium and beryllium, the elements closest related chemically to magnesium cannot be substituted for this element. Calcium, tested at concentrations of 1, 5, 10, and 100 P. P. M., or beryllium, tested at 0.3, 1.0, and 3.5 P. P. M. gave no increase in yield over the very slight yield obtained in the absence of added magnesium.

EXAMPLE III.—EFFECT OF MANGANESE

In this example the medium used was that described above with manganese omitted from the salt mixture. Varying amounts of manganese were added, as $MnCl_2 \cdot 4H_2O$, to indicate the effect of this element. In each case a 50 ml. sample of the medium was inoculated with *B. subtilis* and the culturing carried out by a surface technique at a temperature of 35° C. for 72 hours. The following results were obtained:

Table 3

| Manganese added to medium, P. P. M. | Dry weight of pellicle, mg. | Subtilin produced mg./l. |
|---|---|---|
| 0 | 50 | 0 |
| 0.2 | 250 | 110 |
| 1 | 360 | 810 |
| 50 | 460 | 810 |

By experimentation it was found that none of the following elements are capable of being substituted for manganese, i. e., cadmium, gallium, aluminum, nickel, tin, thallium, cobalt, molybdenum, boron, barium, lead, mercury, strontium, and chromium.

EXAMPLE IV.—EFFECT OF IRON

In this example, the medium used was that described above with iron omitted from the salt mixture. Varying amounts of iron were added, as $FeCl_3 \cdot 6H_2O$, to indicate the effect of this element. In each case a sample of the medium was inoculated with *B. subtilis* and the culturing carried out by a surface technique at a temperature of 35° C. for 72 hours. The following results were obtained:

Table 4

| Iron added to medium, P. P. M. | Dry weight of pellicle, mg. | Subtilin produced, mg./liter |
|---|---|---|
| 0 | 40 | 0 |
| 0.2 | 150 | 300 |
| 1.25 | 425 | 580 |
| 2.0 | 450 | 580 |
| 9 | 275 | 600 |

It was found by experimentation that none of the following elements are capable of being substituted for iron, i. e., cadmium, gallium, aluminum, barium, strontium, copper, nickel, tin, cobalt, molybdenum, calcium, lead, and thallium.

EXAMPLE V.—EFFECT OF ZINC

A medium which had the following ingredients was prepared:

| | |
|---|---|
| Sucrose | 100 g. |
| Asparagin | 2.0 g. |
| Glutamic acid | 2.0 g. |
| Tryptophane | 0.1 g. |
| $Na_2SO_4$ | 4.0 g. |
| $(NH_4)_2HPO_4$ | 8.0 g. |
| NaCl | 0.3 g. |
| Extract of Steffen's waste liquor | 100 ml. |
| Water | Sufficient to make 1 liter |

The medium also contained the following salts in the amounts indicated per liter of medium: $MgSO_4 \cdot 7H_2O$, 0.51 g.; $CaCl_2$, 0.14 g.; $FeCl_3 \cdot 6H_2O$, 0.019 g.; KCl, 0.095 g.; and $MnCl_2 \cdot 4H_2O$, 0.18 g.

This medium was extracted several times with a carbon tetrachloride solution of diphenylthiocarbazone to remove traces of zinc. To the medium was then added graded amounts of zinc, as $ZnCl_2$, to show the effect of this element. In each case a 50 ml. sample of the medium was inoculated with *B. subtilis* and the culturing carried out by a surface technique at a temperature of 35° for 64 hours. The following results were obtained:

Table 5

| Zinc added to medium, P. P. M. | Dry weight of pellicle, mg. | Subtilin produced, mg./liter |
|---|---|---|
| 0 | 33 | 16 |
| 0.25 | 160 | 520 |
| 1 | 240 | 610 |
| 10 | 220 | 620 |

It was found by experimentation that no other element can be adequately substituted for zinc. Cadmium at 1 P. P. M. gave an antibiotic yield of about one-sixth that of zinc at the same concentration. The following elements showed insignificant effects on the yield of subtilin, i. e., aluminum, strontium, gallium, barium, tin, nickel, thallium, lead, copper, cobalt, molybdenum, chromium, and mercury.

EXAMPLE VI.—EFFECT OF PHOSPHORUS

A medium was prepared containing the following ingredients:

| | |
|---|---|
| Sucrose | 100 g. |
| $Na_2SO_4$ | 4 g. |
| NaCl | 0.3 g. |
| Citric acid | 6 g. |
| Asparagin | 8 g. |
| Glutamic acid | 8 g. |
| Salt mixture | 100 ml. |
| Water | Sufficient to make 1 l. |

The salt mixture contained the following salts per liter: KCl, 3.81 g.; $MgCl_2 \cdot 6H_2O$, 4.18 g.; $ZnCl_2$, 0.104 g.; $FeCl_3 \cdot 6H_2O$, 0.245 g.; $MnCl_2 \cdot 4H_2O$, 0.181 g. When added to the medium in the amount indicated it gave (in P. P. M.): potassium, 200; magnesium, 50; zinc, 5; iron, 5.0; and manganese, 5.

Varying amounts of phosphorus were added (as disodium phosphate) to indicate the effect of this element. In each case a 50 ml. sample of the medium was inoculated with *B. subtilis* and the culturing carried out by a surface technique at a temperature of 35° C. for 60 hours. The following results were obtained:

Table 6

| Phosphorus added to medium, P. P. M. | Dry weight of pellicle, mg./50 ml. | Subtilin produced, mg./liter |
|---|---|---|
| 0 | 10 | 0 |
| 200 | 600 | 800 |
| 1,000 | 600 | 400 |

EXAMPLE VII.—EFFECT OF SULPHUR

A medium was prepared containing the following ingredients:

| | |
|---|---|
| Sucrose | 100 g. |
| NaCl | 0.3 g. |
| $(NH_4)_2HPO_4$ | 8 g. |
| Citric acid | 2 g. |
| Asparagin | 2 g. |
| Glutamic acid | 2 g. |
| Salt mixture | 100 g. |
| Water | Sufficient to make 1 liter |

The salt mixture was the same as that employed in the preceding example.

Varying amounts of sulphur were added, as sodium sulphate, to indicate the effect of this element. In each case, a 50 ml. sample of the medium was inoculated with *B. subtilis* and the culturing carried out by a surface technique at a temperature of 35° C. for 72 hours. The following results were obtained:

Table 7

| Sulphur added to medium, P. P. M. | Dry weight of pellicle, mg. | Subtilin produced, mg./liter |
|---|---|---|
| 0 | 40 | 0 |
| 80 | 460 | 800 |
| 800 | 460 | 800 |

EXAMPLE VIII

A medium was made up as follows:

| | |
|---|---|
| Sucrose | 33 lbs. |
| Na$_2$SO$_4$ | 600 g. |
| Yeast extract | 750 g. |
| Diammonium phosphate | 637 g. |
| Citric acid | 1755 g. |
| NaCl | 45 g. |
| Ammonium hydroxide, 28% | 1.8 l. |
| Water | Sufficient to make 150 liters |

Mineral salts were added to furnish:

| | Parts per million |
|---|---|
| Zinc, iron, manganese, each | 5 |
| Magnesium | 50 |
| Potassium | 400 |

The medium was introduced into a large size fermentor, sterilized with steam at 15 lb. pressure, then inoculated with a culture of B. subtilis grown on asparagus juice medium. The culturing was accomplished under submerged conditions by agitating the culture and pumping air into it. After allowing the growth to proceed for 10 hours at 35° C., the culture was harvested and 135 grams of subtilin was obtained (900 mg. per liter).

EXAMPLE IX

The medium in this case was similar to that used in Example VIII with the exception that the sodium chloride was omitted and the concentration of zinc, iron, manganese, and magnesium were doubled, also 830 ml. of asparagus juice were added. This medium was sterilized, inoculated, and the growth carried out as in the previous example. The yield of subtilin in 10 hours was 189 grams or 1260 mg. per liter.

We have emphasized above the mineral requirements of the medium. It is, of course, obvious that the medium must contain the proper ingredients to support growth of the bacillus. Thus the medium must contain, besides water, (a) a source of energy, (b) a source of nitrogen, and (c) the elements specified above. The source of energy may be a carbohydrate such as sucrose, glucose, fructose, galactose, xylose, mannitol, glycerol, maltose, starch, etc. It is generally preferred to use sucrose as this sugar gives high yields of subtilin. Good yields are also obtained with glycerol or glucose. The concentration of the carbohydrate should be enough to provide sufficient nutriment for proper growth. In the case of sucrose good results are obtained with concentrations from about 5 to 25%, a concentration of 7 to 10% being preferred. It is not essential to use purified, individual compounds as the source of energy. Thus one may employ corn sugar, corn syrup, or media made by cooking cereals in water. Suitable cereals are corn, wheat, rye, oats, barley, malted barley, rice, etc.

The source of nitrogen may be an organic or inorganic nitrogen derivative. In the organic category may be mentioned proteins, hydrolyzed proteins, yeast extract, glutamic acid, aspartic acid, asparagin, tryptophane, threonine, histidine, tyrosine, cystine, lanthionine, or other amino acids. For the sake of economy it is usually preferable to use an inorganic nitrogen compound such as ammonia or salts thereof such as ammonium phosphate, ammonium citrate, ammonium acetate, etc. Nitrates may also be used, for example, sodium nitrate, ammonium nitrate, potassium nitrate, etc. In general the concentration of nitrogen should be about .075% to 1%. No deleterious effect is caused by adding more than 1%.

With regard to the elements potassium, magnesium, manganese, iron, and zinc, these elements may be supplied to the medium by any of their salts which are soluble enough to give the desired concentration. Thus the nitrates, sulphates, acetates, chlorides of these metals can be utilized. It is immaterial what salt is used as long as it makes available these metal ions.

In the case of phosphorus and sulphur, these elements can be supplied by suitable water-soluble salts such as sodium phosphates, sodium sulphate, sodium phosphites, sodium sulphite, etc. Obviously other metal ions can be used in place of sodium, such as potassium, ammonium, etc.

The addition of citric acid or other organic acid (or a water-soluble salt thereof such as sodium, potassium or salt) to the medium is often beneficial to act as a buffer and to keep the various salts in solution. Citric acid is especially beneficial where the concentration of iron, magnesium, or phosphorus is too high due, for example, to impurities in the materials used. Thus if the amount of iron in the medium is found to exceed 8 P. P. M. then addition of citric acid will render the medium suitable for maximum growth. The concentration of citric acid may be varied, depending upon the excessive concentration of elements, from about .05% to about 1%. Calcium is often present in natural sources of energy such as molasses, cereal extracts, asparagus juice, etc., and its deleterious effect can be counteracted by adding citric acid. Instead of using pure citric acid one can use natural materials containing the same or similar acids such as asparagus juice, alfalfa juice, beet molasses, Steffen's waste liquor, and other agricultural materials of this type.

Subtilin can be produced in a continuous manner by proceeding in the following way: A medium is prepared containing water, the minerals (K, Mg, Mn, Fe, Zn, S, and P) in the concentrations herein set forth, citric acid or similar organic acid in the proportions set forth, and a small amount of a source energy (such as sucrose, glucose, or glycerol) and a small amount of a source of nitrogen (an ammonium salt or nitrate). The sources of energy and nitrogen are added only in sufficient quantity to enable initial growth to proceed. The medium is inoculated with the proper strain of B. subtilis and culturing is started under the conditions herein set forth. Then, as the culturing proceeds, additional source of energy and source of nitrogen are added as required for the growth of the organism and production of subtilin. A convenient method of adding the source of nitrogen is to add gaseous ammonia directly to the culture. Part of the culture may be drawn off from time to time for isolation of subtilin.

The pH of the culture may vary from about 5.5 to about 7.5. Preferably, the pH is adjusted to about from 6.5 to 7.0 at the start of the incubation, and no attempt need be made thereafter to maintain the pH constant during the production cycle.

The temperature of the submerged culture can be varied from about 30° C. to about 40° C., best results generally being obtained at about 35° C. At temperatures higher than about 35° C., subtilin is produced at a faster rate, but the final yield of subtilin decreases markedly, while at temperatures below about 35° C., the production of subtilin is slow, and thus the operation must be continued for a longer period of time to obtain maximum yield of subtilin. A convenient method of obtaining a high yield of subtilin in a shortened period of time is by employing a temperature above 35° C. (up to about 40° C.) during the initial period of growth, and then decreasing the temperature to about 35° C. when maximum cell volume is obtained. In this manner, the rate of multiplication of the cells is enhanced by the increased temperature, and the production of subtilin, which lags behind the cell production is enhanced by the lower temperature maintained after maximum cell formation has been reached. During the period of rapid growth of the cells, the process is exothermic, and adequate cooling means should be employed to prevent the temperature from rising considerably above 40° C.

The subtilin can be produced by a surface technique or by an aerobic, submerged technique, the latter being preferred to prepare large amounts of the antibiotic. Suitable methods of manipulation and other factors in submerged culture are disclosed in the patent application of Stubbs et al., Ser. No. 776,397, filed Sept. 26, 1947. Methods of isolating the antibiotic from the culture are disclosed in the patent application of Dimick et al., referred to above.

The abbreviation "P. P. M." used herein stands for parts per million.

In broad aspect, the process is characterized as one for preparing subtilin comprising inoculating a nutrient medium with a subtilin-producing strain of *Bacillus subtilis* and incubating the resulting culture until a substantial amount of subtilin is produced, said medium containing a source of energy, a source of nitrogen, and mineral elements in the following concentration:

| | Parts per million |
|---|---|
| K | At least 60 |
| Mg | 4 to 300 |
| Mn | 0.4 to 100 |
| Fe | 0.6 to 100 |
| Zn | 1 to 50 |
| S | At least 20 |
| P | At least 50 |

Having thus described our invention, we claim:

1. A process for preparing subtilin comprising inoculating a nutrient medium with a subtilin-producing strain of *Bacillus subtilis* and incubating the resulting culture until a substantial amount of subtilin is produced, said medium containing a source of energy, a source of nitrogen, and mineral elements in the following concentration:

| | Parts per million |
|---|---|
| K | At least 100 |
| Mg | 5 to 50 |
| Mn | 1 to 50 |
| Fe | 1.25 to 8 |
| Zn | 1 to 10 |
| S | At least 80 |
| P | At least 200 |

2. Process in accordance with claim 1, wherein the source of nitrogen is an ammonium salt.

3. Process in accordance with claim 1, wherein the source of energy is glycerol and the source of nitrogen is an ammonium salt.

4. Process in accordance with claim 1, wherein the source of energy is glucose and the source of nitrogen is an ammonium salt.

5. A process for preparing subtilin comprising inoculating a nutrient medium with a subtilin-producing strain of *Bacillus subtilis* and incubating the resulting culture until a substantial amount of subtilin is produced, said medium containing a source of energy, a source of nitrogen, about 0.05 to about 1% citric acid, and mineral elements in the following concentration:

| | Parts per million |
|---|---|
| K | At least 100 |
| Mg | 5 to 50 |
| Mn | 1 to 50 |
| Fe | 1.25 to 10 |
| Zn | 1 to 10 |
| S | At least 80 |
| P | At least 200 |

6. The process of claim 1 in which the magnesium is about 5 to 7 P. P. M. and the phosphorus content is 200 to 1000 P. P. M.

ROBERT E. FEENEY.
JOHN A. GARIBALDI.

REFERENCES CITED

The following references are of record in the file of this patent:

UNITED STATES PATENTS

| Number | Name | Date |
|---|---|---|
| 2,363,227 | Burkholder | Nov. 21, 1944 |

OTHER REFERENCES

Henrici: Biology of Bacteria (1934), D. C. Heath & Co., page 218.

Jansen et al.: Arch. Biochem. (1944), 4, pages 297–309.

Feeney et al.: Arch. of Biochem., Oct. 1947, pages 13 to 17.